(No Model.)
E. H. INZER.
CHURN.
No. 357,602. Patented Feb. 15, 1887.
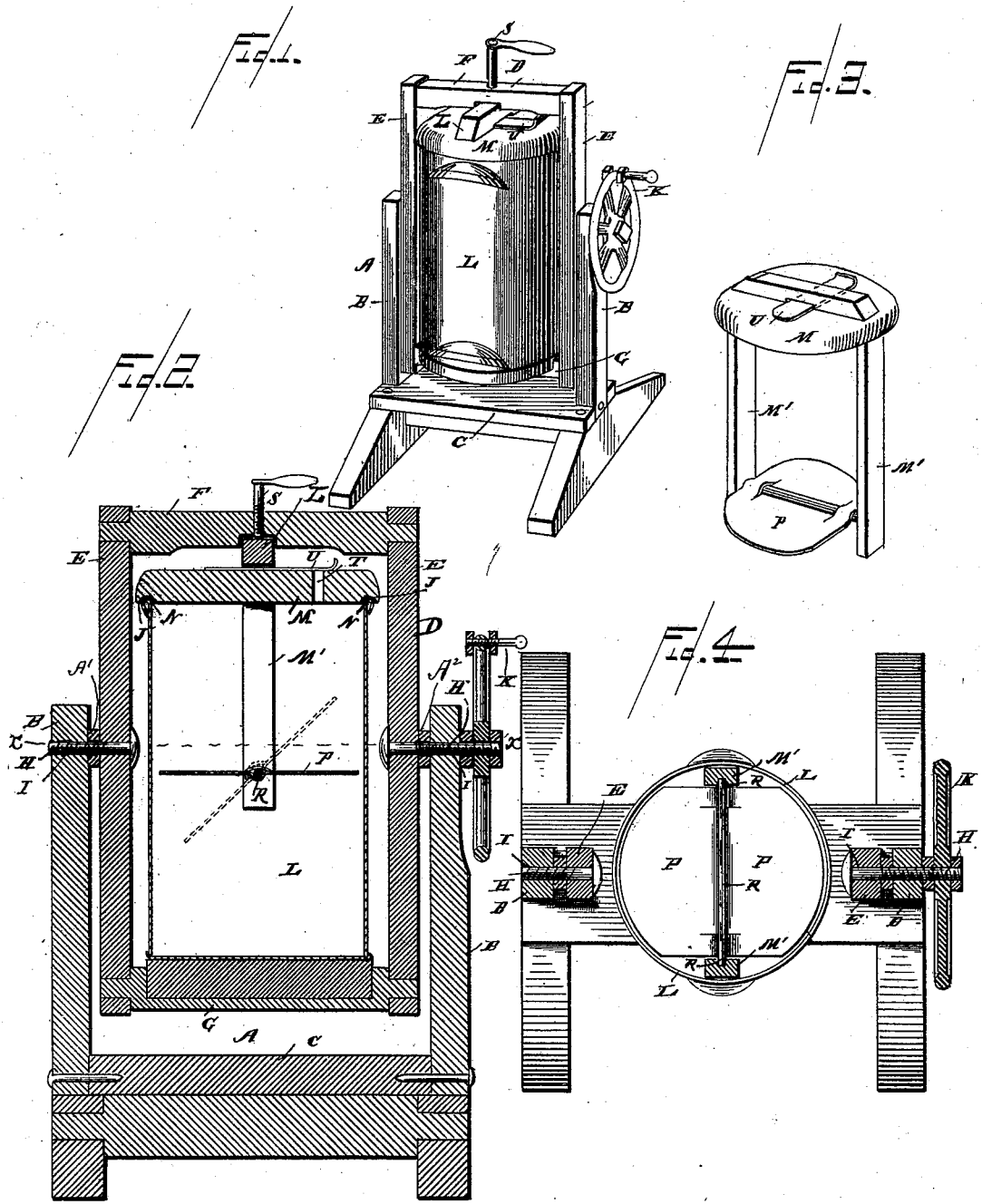

UNITED STATES PATENT OFFICE.

EUGENE HEMBREY INZER, OF TRUSSVILLE, ALABAMA.

CHURN.

SPECIFICATION forming part of Letters Patent No. 357,602, dated February 15, 1887.

Application filed September 25, 1886. Serial No. 214,543. (No model.)

*To all whom it may concern:*

Be it known that I, EUGENE HEMBREY INZER, a citizen of the United States, residing at Trussville, in the county of Jefferson and State of Alabama, have invented a new and useful Improvement in Churns, of which the following is a specification.

My invention relates to an improvement in churns; and it consists in the peculiar construction and combination of devices that will be more fully set forth hereinafter, and particularly pointed out in the claim.

In the drawings, Figure 1 is a perspective view of a churn embodying my improvements. Fig. 2 is a vertical sectional view of the same. Fig. 3 is a detail view of the churn cover and dasher. Fig. 4 is a horizontal sectional view of the churn-body, taken on the line $x\ x$ of Fig. 2.

A represents a vertical supporting-frame, comprising the standards B and the tie-beam C, which connects the said standards.

D represents a rectangular frame, comprising the side bars, E, the top cross-bar, F, and the base-board G, which connects the lower ends of the side bars. From the center of the frame D projects trunnions H, which are journaled in openings I, that are made in the upper ends of the standards B. A crank, K, is attached to one of the trunnions, and by means of the said crank the frame D may be rotated, as will be very readily understood.

L represents a cylindrical churn-body, having a cover, M. The said cover has an annular groove, N, on its under side, to fit over the upper edge of the churn-body, and in the said groove is a packing-ring, J, to effect a water-tight joint between the cover and the churn-body.

A circular dasher, P, is provided with projecting trunnions R, that are journaled in openings made in lower ends of standards M', that depend from the cover and extend to the center of the churn-body. This circular dasher is thus pivoted centrally in the churn-body, and is free to turn therein.

A clamping-screw, S, works in a threaded opening made in the center of the top bar of the revolving frame D, and is adapted to bear upon the cover, so as to clamp the same firmly on the churn-body, and also clamp the latter on the base-board G.

The cover is provided with a vent, T, which is covered by a flat bearing-spring, U, that forms a valve to normally close the vent and open the same under pressure to permit the escape of gas.

The operation of my invention is as follows: The churn-body is partly filled with cream, the cover is placed thereon, and the churn-body is secured on the frame D by the clamping-screw. The frame D is then rotated by means of the crank-handle, thus rotating the churn-body, and the cream is dashed from end to end thereof with great force, thus agitating the cream until it is churned to butter. The circular pivotal dasher serves to assist in the agitation of the cream and adds to the efficiency of the churn. When the churn-body is rotated, the cream rushes from end to end thereof at each semi-revolution. When the cream reaches the center of the churn, as the latter assumes a horizontal position, it strikes against the pivoted dasher, thereby inclining the same, which causes the cream to be diverted violently and dashed against one side of the churn before it reaches the end thereof. On the return movement of the cream the dasher is inclined in the opposite direction, and the process before described is repeated. The cream is thus very violently agitated, and consequently the operation of converting the cream into butter is performed in a comparatively short time. The spring-valve which covers the vent permits the escape of gas which accumulates in the churn-body during the operation of churning. The spring-valve is of sufficient strength to prevent the cream from escaping through the opening T while the churn is inverted.

It will be readily understood that when the cover is taken from the churn-body the pivoted dasher is withdrawn therefrom, and thus the dasher, the cover, and the churn-body may be easily cleaned.

The nuts $A'\ A^2$ on the bolts or trunnions H are interposed between the standards B and the side bars, E, so that the movement of the churn can be effected without liability of the churn binding against or striking the standards B. The cross-bar Z on top of the churn-cover fits in a slot of bar F, so that when the clamping-screw S is applied the arrangement of the cross-bar effectually prevents the churn-body from slipping laterally.

No claim is made, broadly, herein to a whirling churn-body having a dasher journaled therein, as I am aware that it has been heretofore proposed to employ such devices.

I am also aware that it has been heretofore proposed to construct a churn having a whirling frame, a removable churn-body therein, and having a cover provided with a depending dasher, the whirling frame being provided with a clamp to secure the cover to the churn-body and the latter to the frame; and this, also, I disclaim.

Having thus described my invention, I claim—

In a working-body churn, the combination of the whirling frame D, having the cross-bar at one end, with the notch on its inner side, and the clamping-screw extending through the said bar and entering the notch, the churn-body adapted to fit in the frame D, the cover therefor having the depending standards, and the rotating dasher pivoted between the said standards, the axis of the said dasher being at right angles to the major axis of the churn, and the bar L, to fit on the cover and enter the notched bar under the clamp-screw, for the purpose set forth, substantially as described.

In testimony that I claim the foregoing as my own I have hereto affixed my signature in presence of two witnesses.

EUGENE HEMBREY INZER.

Witnesses:
N. L. MILLER,
H. C. MILLER.